Dec. 3, 1929.     J. R. CRAIN     1,737,919
FROZEN CONFECTION AND PROCESS OF MANUFACTURE
Filed March 24, 1927     2 Sheets-Sheet 1
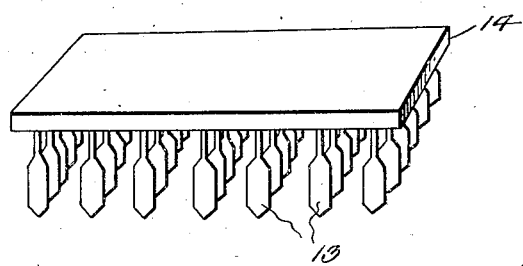
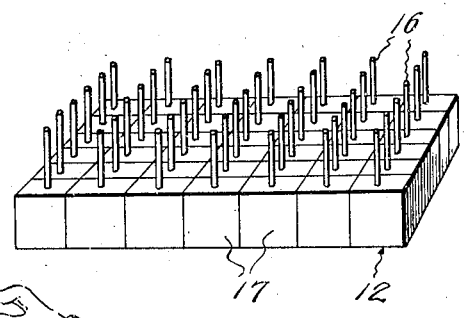
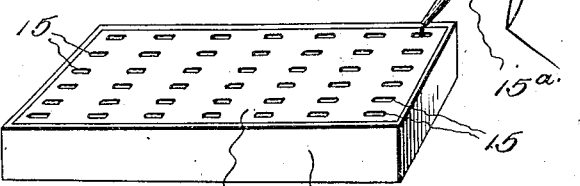
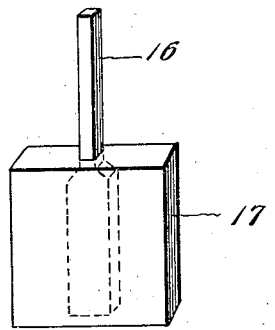
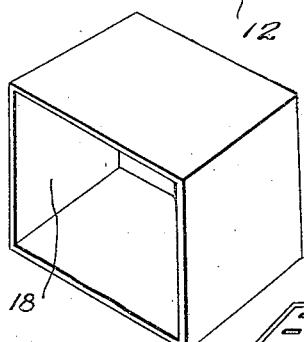
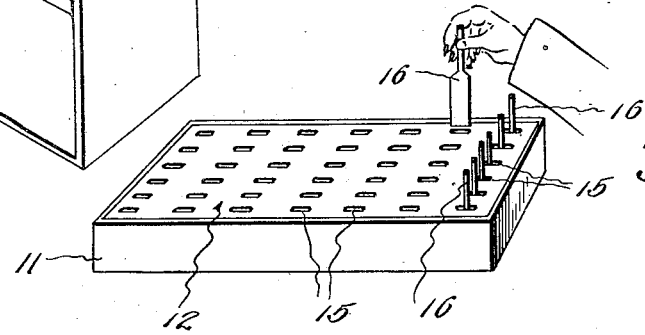
Witness
I. R. Pierce
Inventor
J. R. Crain.
By H. B. Wilson & Co.
Attorneys Dec. 3, 1929.   J. R. CRAIN   1,737,919
FROZEN CONFECTION AND PROCESS OF MANUFACTURE
Filed March 24, 1927   2 Sheets-Sheet 2
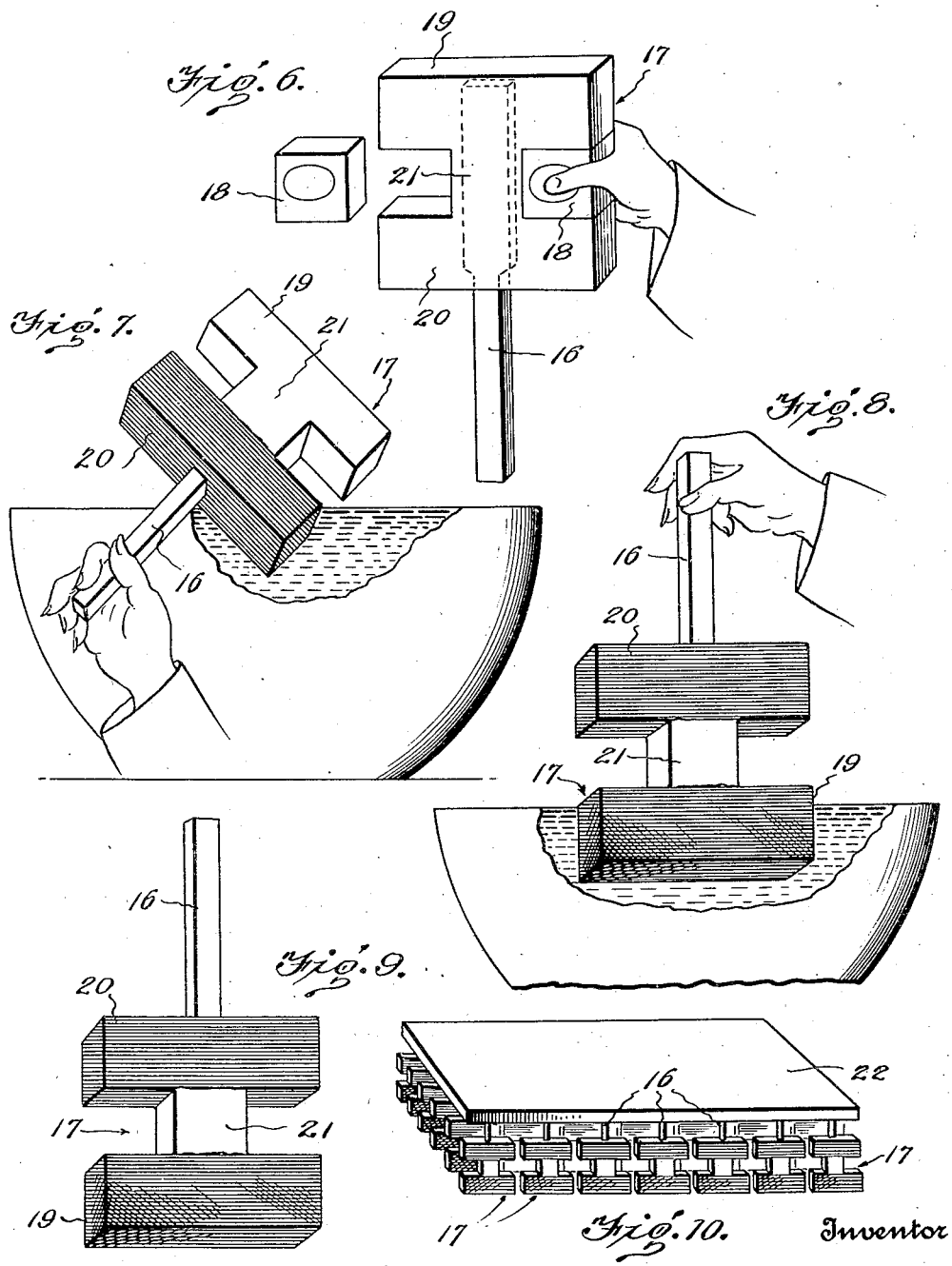

Patented Dec. 3, 1929

1,737,919

UNITED STATES PATENT OFFICE

JACK R. CRAIN, OF SAN ANTONIO, TEXAS, ASSIGNOR OF ONE-HALF TO CLAUDE V. BIRKHEAD, RAYMOND PHELPS, AND GEORGE DAHL DEWEES, ALL OF SAN ANTONIO, TEXAS

FROZEN CONFECTION AND PROCESS OF MANUFACTURE

Application filed March 24, 1927. Serial No. 178,050.

The invention relates to frozen confections of the general type provided with a stick by means of which the confection may be handled prior to sale and by which it may be held while it is being eaten.

One object of the invention is to provide a new and improved process for manufacture of such confections, embodying novel steps which facilitate quantity production in a sanitary manner.

Another aim is to make unique provision insuring effective anchorage of the sticks in the confections.

A still further aim is to provide for the production of a frozen confection which will possess different portions having different characteristics as to flavor, appearance or both, thereby catering to the various wishes of customers.

With the foregoing in view, the invention resides in the novel subject matter hereinafter described and claimed, the description being supplemented by the accompanying drawings.

Fig. 1 is a perspective view of the cores and their carrying member, by means of which sockets are formed in a partly frozen body, said sockets later receiving the sticks.

Fig. 2 is a perspective view of the partly frozen body with the sockets formed therein and illustrating the manner of placing quantities of water in the sockets to materially assist in anchoring the sticks when the body is completely frozen.

Fig. 3 is a perspective view illustrating the manner of inserting the sticks into the water-containing sockets.

Fig. 4 is a perspective view of the completely frozen body with the attached sticks, said body being cut into a plurality of blocks, each having a stick.

Fig. 5 is a perspective view of one of the blocks and its stick.

Fig. 6 is a perspective view illustrating the manner in which edge portions of the block are cut out, leaving said block with bar-like portions transverse to the stick and with a longitudinal portion connecting said bar-like portions and extending in a direction longitudinally of the stick.

Figs. 7 and 8 are perspective views partly broken away, illustrating one manner in which the transverse bar-like portions of the block may be coated to give them different characteristics, as to flavor, appearance, or both.

Fig. 9 is a perspective view of a completed confection.

Fig. 10 is a perspective view illustrating the manner in which a plurality of the confections may be supported preparatory to enveloping them with sanitary paper wrappers, in which supported condition, the confections may be kept under proper temperature conditions, for any desired length of time.

Fig. 11 is a detail perspective view of one of the cutters for completing the shape of the blocks.

In an open-topped container 11, I partly freeze a body 12, the ingredients of which may be the same as those commonly used in making ice cream, sherbets, frozen custards or ices. Into this partly frozen body 12, I downwardly force a plurality of paddles or cores 13 which are mounted on an appropriate carrier 14. When these paddles or cores are withdrawn, sockets 15 which they have formed, remain in the partly frozen body 12. Then, by suitable means, such as a hand bulb 15ª, I inject small quantities of water into these sockets 15. Now, sticks 16, preferably of paddle-like form, are positioned in the water-containing sockets as shown in Fig. 3. I now complete the freezing operation of the body 12 and during this operation, the prevalence of the water around the sticks 16, insures effective and rigid connection of said sticks with the frozen material.

The body 12 and the sticks 16, are now removed from the container 11 and by suitable means, said body is cut up into a plurality of blocks 17, each of rectangular form and provided with one of the sticks 16. Now, by means of appropriate cutters 18, operated by hand or otherwise, longitudinal edge portions of each block 17 are cut out, leaving said block with two bar-like end portions 19 and 20, transverse to the stick 16, and with a central portion 21 which integrally joins said portions 19 and 20 and extends in a direction which is longitudinal with respect to the aforesaid stick. The cutters are preferably in the form of rectangular box-like structures the open sides of which are forced through the longitudinal edge portions of the block by the thumb and fingers and then drawn laterally from the block with the cut out portion of the block therein as clearly shown in Figure 6 of the drawing. In this connection, it will be observed that the portion of the stick 16, embedded in the block 17, passes entirely through the block portions 20 and 21 and extends an appreciable distance into the portion 19. Thus, these three portions 19, 20 and 21 are effectively reinforced against accidental breakage from each other.

As will be clear from Figs. 7 and 8, the end portions 19 and 20 may now be dipped or otherwise treated or coated, so as to give them different characteristics as to appearance, flavor, or both, and one of the coatings may if desired, contain nut meats or particles of other edible substances. Of course, this is also true of the coatings for both of the end portions 19 and 20. The intermediate or connecting portion 21 however, preferably, although not necessarily, remains uncoated, but when one flavor is given to the bar portion 19, another to the bar portion 20 and the intermediate portion 21 merely contains the flavor originally given to the body 12, an exceptionally palatable and desirable, three-flavor confection is produced.

As the confections are completed, they may be suspended from an appropriate support 22, in spaced, orderly fashion, permitting sanitary bags to be readily passed upwardly around them. Moreover, when so supported, a plurality of the confections may be conveniently stored under proper refrigerating conditions.

Due to the shape of the confection, it may be eaten much more readily than if some other shape were followed. The ends of the transverse portions 19 and 20 may be easily inserted into the mouth one at a time and bitten from the block, leaving the central portion 21 and in fact the entire central longitudinal portion of the block upon the stick, which portion is of such size that it may be readily bitten away, leaving only the stick.

As excellent results are obtainable from the subject matter herein disclosed, such subject matter may well be strictly followed. However, within the scope of the invention as claimed, numerous variations may be made.

I claim:—

1. In the manufacture of a frozen confection, the steps of forming a socket in a partly frozen body, placing a quantity of a freezable liquid in said socket, inserting an end of a stick into the liquid-containing socket, and completing the freezing operation with the stick in the socket.

2. In the manufacture of frozen confections, the steps of forming a partly frozen body in a container, downwardly forcing a plurality of cores into said partly frozen body while in the container to form a plurality of sockets therein, placing quantities of a freezable liquid in said sockets, inserting the lower ends of a plurality of sticks into the liquid containing sockets while the body is in the container, completing the freezing operation with the sticks in the sockets and the body still in the container, removing the completely frozen body and the sticks from the container, and cutting said body into blocks each having a stick.

In testimony whereof I have hereunto affixed my signature.

JACK R. CRAIN.